United States Patent [19]

Kanda et al.

[11] 4,397,259

[45] Aug. 9, 1983

[54] SPRAYING APPARATUS FOR COATING GLASS SHEET WITH METAL OXIDE

[75] Inventors: Yoshihumi Kanda; Isamu Morita, both of Ichishi; Takayoshi Kandachi, Matsusaka; Kazuyuki Kiriu, Ichishi, all of Japan

[73] Assignee: Central Glass Company Limited, Ube, Japan

[21] Appl. No.: 377,955

[22] Filed: May 13, 1982

[30] Foreign Application Priority Data

May 14, 1981 [JP] Japan .................................. 56-72425

[51] Int. Cl.³ ........................ B05B 3/18; B05B 13/02
[52] U.S. Cl. .................................... 118/323; 118/326; 118/DIG. 7; 427/424
[58] Field of Search ................. 118/323, 326, DIG. 7; 427/424

[56] References Cited

U.S. PATENT DOCUMENTS

| | | | |
|---|---|---|---|
| 3,601,089 | 8/1971 | Petermann | 118/326 |
| 3,689,304 | 9/1972 | Bamford | 118/326 X |
| 3,841,858 | 10/1974 | Akashi et al. | 118/323 X |
| 3,885,066 | 5/1975 | Schwenninger | 118/323 X |

Primary Examiner—Shrive P. Beck

Attorney, Agent, or Firm—Fleit, Jacobson & Cohn

[57] ABSTRACT

A spraying apparatus for coating a hot and horizontally travelling glass sheet with a metal oxide coating film such as a heat-reflecting film by spraying an organometallic compound solution downwardly against the glass sheet. The apparatus comprises a spray gun movable over and transversely of the glass sheet, an outer enclosure and an inner hood, which has a middle portion defining therein a spraying zone and two end portions which are adjacent and upstream and downstream of the middle portion, respectively, and so shaped as to provide exhaust passages. The middle portion comprises two vertical guide plates arranged such that an ambient gas admitted through the space between the outer enclosure and the inner hood and an upper opening of the hood flows vertically downward into the spraying zone without unfavorably influencing the downward flow of the sprayed solution. The inlet to the exhaust passage in each end portion of the hood is so arranged as to smoothly exhaust the decomposition gas, residual portion of the sprayed solution and the admitted ambient gas from the spraying zone. In this apparatus, the metal oxide coating film can be formed with improved uniformity of its thickness and enhanced strength of adhesion to the glass sheet.

4 Claims, 2 Drawing Figures

SPRAYING APPARATUS FOR COATING GLASS SHEET WITH METAL OXIDE

BACKGROUND OF THE INVENTION

This invention relates to an apparatus for coating the surface of a continuous ribbon-like glass sheet with a metal oxide to alter some optical or electrical properties of the glass sheet by spraying a solution of at least one ogranometallic compound which can be thermally decomposed to the intended metal oxide onto the glass surface while the glass sheet is horizontally travelling in a heated state, the apparatus being of the type having a spray gun which is reciprocatingly movable above and transversely of the glass sheet. For example, the apparatus is useful in the production of heat-reflecting glass sheet.

It is popular to form a thin coating film of a metal oxide on the surface of a glass sheet for the purpose of altering certain optical or electric properties of the glass sheet. A prevailing method of coating the surface of a glass sheet with a metal oxide is spraying of a solution of at least one organometallic compound, which can be decomposed to the intended metal oxide by heating, in an organic solvent onto the surface of the glass sheet while the glass sheet is in a sufficiently heated state.

For example, this coating method is widely employed in the industrial production of heat-reflecting glass sheet and is often performed in the manner of a continuous process by using a spraying apparatus having a spray gun which is arranged above the path of a hot and horizontally travelling glass ribbon and is reciprocatingly movable across the width of the glass ribbon. The spraying apparatus includes exhaust ducts to discharge the decomposition gas evolved by the pyrolysis of the sprayed ogranometallic compound solution on the glass surface and the unreacted residual portion of the spray from the spraying zone.

As is well known, the optical properties and mechanical strength of the metal oxide coating film formed by this method depend significantly on the temperature of the gas atmosphere in the spraying zone and the efficiency of the exhausting of the decomposition gas and the residual portion of the sprayed solution. With due consideration of this matter, U.S. Pat. No. 4,064,832 shows a spraying apparatus including an outer enclosure and an inner hood which defines a spraying zone in its middle portion having two slant walls arranged symmetrically with respect to the path of the movement of a spray gun across the width of a glass ribbon travelling beneath and provides upright exhaust passages in its two end portions located adjacent and respectively upstream and downstream of the spraying zone. In this apparatus, the space between the outer enclosure and the inner hood is used as a gas passage to introduce a suitable quantity of an ambient gas heated by the heat of the hot glass ribbon into the spraying zone through a slot in the top wall of the middle portion of the inner hood. By using this spraying apparatus it is possible to form a metal oxide coating film such as a heat-reflecting film of fairly good optical and mechanical properties on the glass surface.

However, it has been recognized that a metal oxide coating film formed by using the spraying apparatus according to this U.S. patent is not always sufficient in the uniformity of its thickness and in the strength of adhesion to the glass surface. Probably, such a matter of unsatisfactoriness is attributed to some interfering influences of the flow of the introduced ambient gas in the spraying zone along the aforementioned slant walls on the flow of the sprayed solution toward the glass surface and the flow of the decomposition gas into the exhaust passages.

SUMMARY OF THE INVENTION

It is an object of the present invention to provide an improved spraying apparatus for coating the upper surface of a hot and horizontally travelling glass ribbon with a metal oxide film by spraying a solution of at least one organometallic compound which can be thermally decomposed to the intended metal oxide onto the glass surface, the apparatus being of the type having a downwardly directed spray means which is reciprocatingly movable over and transversely of the glass ribbon, an outer enclosure and an inner hood which defines a spraying zone therein and provides exhaust passages and being capable of producing a very good spray pattern and efficiently exhausting the decomposition gas and the residual portion of the spray so that the metal oxide coating film can be formed with improved uniformity in its thickness and enhanced strength of adhesion to the glass surface.

A spraying apparatus according to the invention comprises a spray means for spraying a solution of at least one organometallic compound of the aforementioned type downwardly against the upper surface of a hot and horizontally travelling glass sheet, the spray means having a spray nozzle held at a predetermined distance above the glass sheet and reciprocatingly movable over and transversely of the glass sheet, an outer enclosure held above the glass sheet so as to leave a gap between the glass sheet and the lower end of the outer enclosure, and an inner hood which is entirely enclosed in the outer enclosure so as to leave a space which serves as a gas passage therebetween. The inner hood comprises a middle portion receiving therein the spray nozzle and defining therein a spraying zone and two end portions which are adjacent the middle portion and located upstream and downstream of the middle portion, respectively. The middle portion is constructed in a generally symmetrical shape with respect to a vertical plane containing the path of the transverse movement of the spray nozzle and comprises a central top portion formed with an opening to allow the spray means to move therethrough and to admit an ambient gas flowed into the aforementioned gas passage into the spraying zone therethrough and two vertical guide plates, which are arranged symmetrically with respect to the aforementioned vertical plane and extend downward from the central top portion such that the lower edge of each guide plate is at nearly the same level above the glass sheet as the spray nozzle. Each of the two end portions of the inner hood is so shaped as to provide an exhaust passage which is contiguous to the spraying zone at an inlet opening having a lower boundary at a level slightly above the glass sheet and an upper boundary at nearly the same level as the spray nozzle.

Preferably, the middle portion of the inner hood is formed with two slant walls which are arranged symmetrically with respect to the aforementioned vertical plane such that the horizontal distance of each slant wall from the vertical plane becomes smallest at its upper edge where the slant wall joins the central top portion and greatest at a lower edge which coincides with the upper boundary of the inlet opening of one of the exhaust passages.

Owing to the provision of the two vertical guide plates the ambient gas admitted through the upper opening of the inner hood flows vertically downwardly into the spraying zone without unfavorably influencing the flow of the solution sprayed from the nozzle. Accordingly a conical spray pattern having a desirably small angle of apex can be established in the spraying zone, whereby the metal oxide coating film can be formed with improved uniformity in its thickness. Besides the regulation of the flow of the admitted ambient gas by the vertical guide plates, the arrangement of the inlet openings of the exhaust passages in the respective end portions of the inner hood enables to smoothly and efficiently extract the decomposition gas and the residual portion of the sprayed solution, as well as the ambient gas admitted into the spraying zone, into the exhaust passages. This is effective for enhancement of not only the uniformity of the thickness of the metal oxide coating film but also the strength of adhesion of the metal oxide film to the surface of the glass sheet.

DESCRIPTION OF THE PREFERRED EMBODIMENTS

Figure 1:
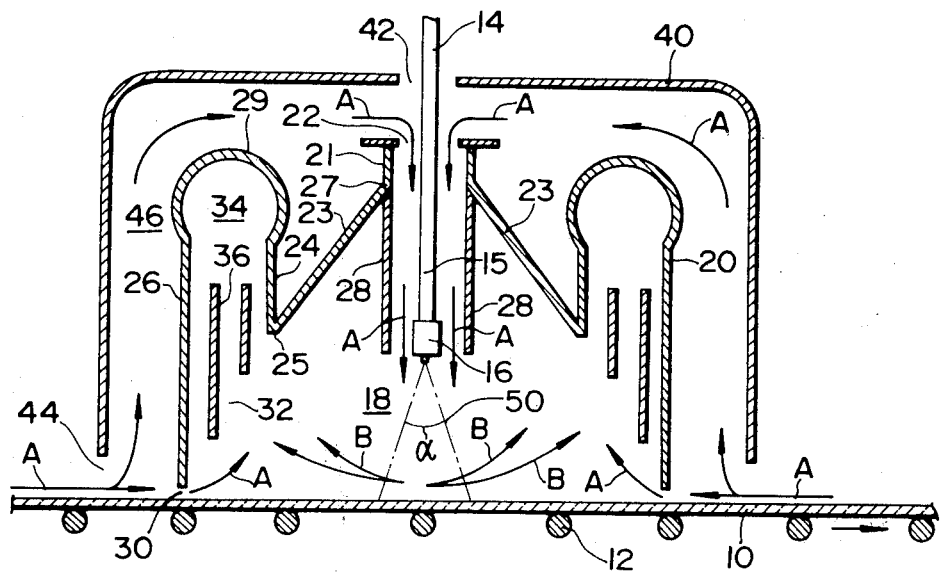
FIG. 1 is a schematic and vertical sectional view of a spraying apparatus embodying the present invention.

FIG. 1 shows a spraying apparatus according to the invention for producing a heat-reflecting glass sheet by forming a metal oxide coating film such as a titanium oxide film on the surface of a hot and continuous glass ribbon 10, which is supported horizontally on conveyor rolls 12 and remains at an adequately elevated temperature which is usually in the range from about 500° to 600° C. Fundamentally the spraying apparatus is made up of a conventional spray gun 14, inner hood 20 defining therein a spraying zone 18 and an outer enclosure 40. The inner hood 20 is so designed as to provide exhaust passages 34 as will later be described.

The spray gun 14 disposed in the middle of the spraying apparatus has a downwardly directed spray nozzle 16 at the lower end of a vertical shaft 15 which extends through a slot-like opening 22 in the top of the inner hood 20 and a slot 42 in the ceiling of the outer enclosure 40 and is supported by a carriage (not shown) located upwards. The spray nozzle 16 is held at a predetermined distance above the upper surface of the glass ribbon 10, and the vertical shaft 15 is reciprocatingly movable in a vertical plane that perpendicularly traverse the path of the travel of the glass ribbon 10 so that the spray nozzle 16 makes a reciprocating movement over and across the width of the glass ribbon 10. In the case of coating the glass ribbon 10 with a titanium oxide film by way of example, the spray gun 14 is supplied with a solution of a selected organic titanium compound, e.g. an alkyl titanate or a titanium acetyl acetonate, in an organic solvent.

Since the inner hood 20 is constructed in a symmetrical shape with respect to the path of the transverse movement of the vertical shaft 15 of the spray gun 14 as can be seen in FIG. 1, a detailed description of the construction of the inner hood 20 will be made only in respect of its one half for the sake of simplicity. As a principal component of a middle portion of the inner hood 20, there is a slant wall 23 with its upper edge 27 at a short horizontal distance from the shaft 15 of the spray gun 14 and its lower edge 25 at a fairly long horizontal distance from the shaft 15. At the upper edge 27, this slant wall 23 joins a vertical wall 21 which is a part of the central top portion of the hood 20. The vertical distance of the lower edge 25 of the slant wall 23 from the glass ribbon 10 is nearly equal to, or somewhat greater than, the distance of the spray nozzle 16 from the glass ribbon 10.

From the joint edge 27 between the vertical wall 21 and the slant wall 23, a vertical guide plate 28 extends downwardly along the path of the transverse movement of the spray gun 14. The lower edge of this guide plate 28 is at nearly the same vertical distance from the glass ribbon 10 as the spray nozzle 16.

An end portion of the inner hood 20 has a relatively short vertical wall 24 of which the lower edge coincides with the lower edge 25 of the slant wall 23, a relatively tall vertical wall 26, which is an endmost wall of the inner hood 20 and has its lower edge at a very short vertical distance from the glass ribbon 10, and a curved ceiling wall 29 which joins the upper edge of the shorter vertical wall 24 with the upper edge of the taller vertical wall 26. These three walls 24, 26 and 29 constitute a part of an exhaust duct which extends to a suction means such as a ventilation fan (not shown), so that a space 34 defined in these walls 24, 26, 29 serves as an exhaust passage to discharge the decomposition gas and a residual portion of the sprayed solution from a spraying zone 18 beneath the slant walls 23. A relatively wide gap 32 between the lower edge 25 of the slant wall 23 and the lower edge of the endmost vertical wall 26 becomes an inlet opening of the exhaust passage 34. Indicated at 36 are baffle plates vertically disposed in the space between the two vertical walls 24 and 26 such that the lower edges of the respective baffle plates 36 are at the inlet opening 32, i.e. on an imaginary slant plane containing the lower edge 25 of the slant wall 23 and the lower edge of the vertical wall 26.

The outer enclosure 40 encloses therein the entire portion of the inner hood 20 and is sufficiently spaced from every wall of the inner hood 20. The outer enclosure 40 leaves a small gap 44 between the glass ribbon 10 and the lower edges of the vertical walls of the outer enclosure 40. The gap 44 serves as an inlet opening of a space or gas passage 46 defined between the outer enclosure 40 and the inner hood 20. Accordingly, an ambient gas heated by the heat of the hot and continuously travelling glass ribbon 10 flows into the spraying zone 18 from the opening 44 via the gas passage 46 and the opening 22 in the top of the inner hood 20, as indicated by arrows A, while a certain quantity of the ambient gas directly enters the spraying zone 18 through a narrow gap 30 between the glass ribbon 10 and each endmost wall 26 of the inner hood 20. Preferably, the horizontal top walls of the central portion of the inner hood 20 are made slidable in order that the width of the opening 22 may be regulated.

Where the spraying apparatus is constructed adjacent an annealing furnace, it is possible to utilize a portion of the wall structure of the annealing furnace as at least a part of the vertical walls of the outer enclosure 40 of the spraying apparatus.

Figure 2:
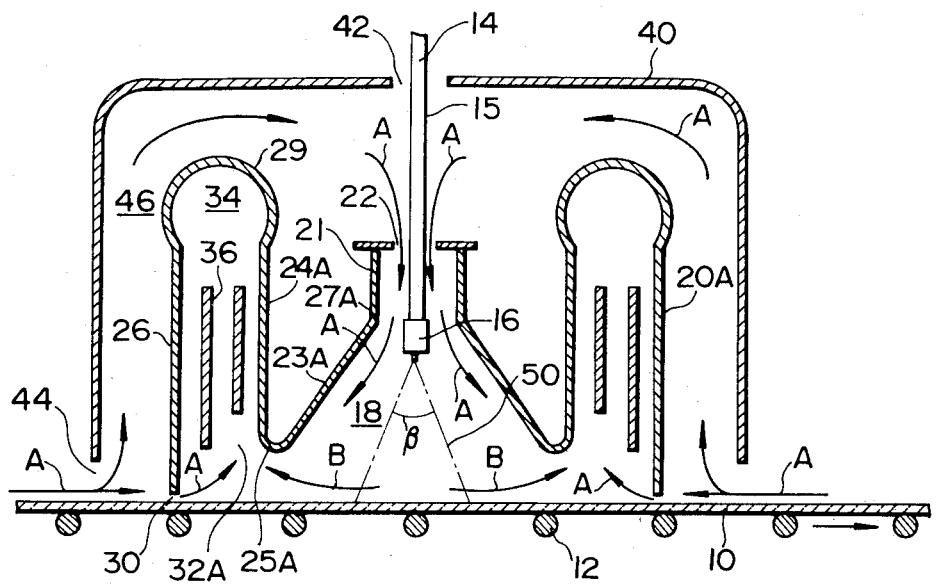
FIG. 2 is a schematic and vertical sectional view of a conventional spraying apparatus which is fundamentally of the same type as the apparatus of FIG. 1.

To facilitate understanding of the features and advantages of the spraying apparatus of FIG. 1, FIG. 2 shows a resembling spraying apparatus according to the aforementioned U.S. Pat. No. 4,064,832 but not in accordance with the present invention. The outer enclosure 40 and the spray gun 14 in the apparatus of FIG. 2 are identical with the counterparts in FIG. 1. Since the inner hood 20A in FIG. 2 has a symmetrical shape with respect to the path of the movement of the spray gun 14, the points of difference of this inner hood 20A from the inner hood 20 in FIG. 1 will be described only in respect of one half of the hood 20A. There is a slant wall 23A corresponding to the slant wall 23 in FIG. 1, but in the case of FIG. 2 the upper edge 27A of the slant wall 23A is close to the spray nozzle 16 and, hence, the lower edge 25A of this slant wall 23A is at a very short distance from the glass ribbon 10 compared with the lower edge 25 of the slant wall 23 in FIG. 1. As a more important difference, the middle portion of this inner hood 20A has no guide plate corresponding to the guide plates 28 in FIG. 1. In the end portion of the inner hood 20A, the shorter vertical wall 24A extends downwards since the lower edge of this vertical wall 24A must coincide with the lowered lower edge 25A of the slant wall 23A. Consequentially, each inlet opening 32A of the exhaust passage 34 in the apparatus of FIG. 2 becomes narrower than the inlet opening 32 in FIG. 1 and faces to only a lower end region of the spraying zone 18.

A portion of the heated ambient gas admitted into the spraying apparatus of FIG. 2 through the openings 44 at the lower end of the outer enclosure 40 passes through the gaps 30 between the endmost walls 26 of the inner hood 20A and the glass ribbon 10 to enter the inner hood 20A, and the remaining portion of the gas flows through the space 46 between the outer enclosure 40 and the inner hood 20A to enter the spraying zone 18 via the opening 22 in the central top of the inner hood 20A. In the spraying zone 18, the ambient gas admitted through the upper opening 22 mostly flows along the downwardly diverging surfaces of the two slant walls 23A. This flow of the ambient gas has the effect of laterally extracting a portion of the solution sprayed from the nozzle 16. Consequentially, a conical spray pattern 50 produced in the spraying zone 18 tends to have a relatively large angle $\beta$ of apex, and this becomes a cause of unsatisfactoriness in the uniformity of the thickness of the metal oxide coating film formed on the glass ribbon 10. Furthermore, the flow of the ambient gas along the slant walls 23A forces the decomposition gas evolved by the pyrolysis of the sprayed solution on the surface of the glass ribbon 10 and the unreacted residual portion of the sprayed solution to flow almost parallel to the glass ribbon 10, as indicated by arrows B, toward the inlet openings 32A of the exhaust passages 34. Due to such a direction of flow in the spraying zone 18 and the arrangement of the inlet openings 32A, most of the decomposition gas and the residual portion of the spray pass through a narrow region in the vicinity of the lower edge 25A common to each slant wall 23A and the adjacent vertical wall 24A, while the ambient gas also flows out of the spraying zone 18 into the exhaust passage 34 along the same edge 25A. Such localized flows of the gases constitute an obstacle to the suction effect of the exhaust passages 34 at the inlet openings 32A and, hence, cause the flows of gases in the spraying zone 18 to become irregular or unsmooth. For these reasons the metal oxide coating film formed in the spraying apparatus of FIG. 2 is liable to remain insufficient in the uniformity of its thickness or the strength of adhesion to the glass ribbon 10.

Referring again to FIG. 1, in the spraying apparatus according to the invention the ambient gas admitted into the inner hood 20 through the upper opening 22 flows vertically downward along the two vertically disposed guide plates 28 and, therefore, aids the solution sprayed from the nozzle 16 in flowing almost vertically downward. Consequentially a conical spray pattern 50 produced in the spraying zone 18 has an angle $\alpha$ of apex smaller than the corresponding angle $\beta$ in the apparatus of FIG. 2, and this is effective for enhancing the uniformity of the thickness of the metal oxide coating film formed on the glass ribbon 10. Furthermore, the provision of the vertical guide plates 28 and the elevated positioning of the slant walls 23 to upwardly enlarge the inlet openings 32 of the exhaust passages 34 have a joint effect of smoothly and efficiently extracting the decomposition gas and the residual portion of the sprayed solution as well as the ambient gas admitted into the inner hood 20 into the exhaust passages 34 without allowing the gases to stagnate in the spraying zone 18 or in local spaces in the vicinity of the respective inlet openings 32. For these reasons, the spraying apparatus of FIG. 1 makes it possible to coat the glass ribbon 10 with a metal oxide film which is quite uniform in its thickness and optical or electrical properties and very high in the strength of adhesion to the glass ribbon 10.

What is claimed is:

1. An apparatus for coating a hot and horizontally travelling glass sheet with a metal oxide film, the apparatus comprising:

a spray means for spraying a solution of at least one organometallic compound which can be thermally decomposed to an intended metal oxide downwardly against the upper surface of the glass sheet, the spray means having a spray nozzle which is held at a predetermined vertical distance above the glass sheet and reciprocatingly movable over and transversely of the glass sheet;

an outer enclosure held above the glass sheet so as to leave a gap between the glass sheet and the lower end of the outer enclosure; and an inner hood which is entirely enclosed in said outer enclosure so as to leave a space which serves as a gas passage therebetween and comprises a middle portion receiving therein said spray nozzle and defining therein a spraying zone and two end portions which are adjacent said middle portion and located upstream and downstream of said middle portion, respectively, said middle portion being constructed in a generally symmetrical shape with respect to a vertical plane containing the path of the transverse movement of said spray nozzle and comprising a central top portion formed with an opening to allow said spray means to move therethrough and to admit an ambient gas flowed into said gas passage into said spraying zone therethrough and two vertical guide plates which are arranged symmetrically with respect to said vertical plane and extend downward from said central top portion such that the lower edge of each of the two guide plates is at nearly the same level above the glass sheet as said spray nozzle, each of said two end portions being so shaped as to provide an exhaust passage which is contiguous to said spraying zone at an inlet opening having a lower boundary at a level sightly above the glass sheet and an upper boundary at nearly the same level as said spray nozzle.

2. An apparatus according to claim 1, wherein said middle portion of said inner hood further comprises two slant walls arranged symmetrically with respect to said vertical plane, the horizontal distance of each of the two slant walls from said vertical plane becomes smallest at an upper edge where the slant wall joins said central top portion and greatest at a lower edge which coincides with said upper boundary of said inlet opening of said exhaust passage.

3. An apparatus according to claim 2, wherein each of said two end portions of said inner hood comprises a relatively short vertical wall extending upwardly from said lower edge of each of said slant walls, a relatively tall vertical wall which is spaced from sid relatively short vertical wall to serve as an endmost wall of said inner hood and has a lower edge which becomes said lower boundary of said inlet opening and an upper wall extending between the upper edge of said relatively short vertical wall and the upper edge of said relatively tall vertical wall, whereby the horizontal distance of said inlet opening of said exhaust passage from said vertical plane becomes smallest at said upper boundary and greatest at said lower boundary.

4. An apparatus according to claim 3, wherein each of said end portions of said inner hood further comprises at least one baffle plate vertically disposed in the space between said relatively short vertical wall and said relatively tall vertical wall such that the lower edge of each baffle plate lies on said inlet opening of said exhaust passage.

* * * * *